HALL-VOLTAGE GENERATING DEVICE

Filed March 30, 1959

United States Patent Office 2,986,711
Patented May 30, 1961

2,986,711

HALL-VOLTAGE GENERATING DEVICE

Friedrich Kuhrt and Walter Engel, Nurnberg, Germany, assignors to Siemens-Schuckertwerke Aktiengesellschaft, Berlin, Germany, a corporation of Germany Filed Mar. 30, 1959, Ser. No. 803,020

Claims priority, application Germany Mar. 28, 1958

7 Claims. (Cl. 332—51)

Our invention relates to electric translating devices comprising a Hall-voltage generator for modulating a direct-current or low-frequency-current magnitude, converting direct current into alternating or intermittent current, or for use as a chopper in direct-voltage amplifiers, thermo-voltage amplifiers, and similar purposes. In a more particular aspect, the invention relates to improvements of translating devices in which, according to U.S. Patent 2,862,189 of F. Kuhrt, assigned to the assignee of the present invention, the disturbing effects of magnetic remanence are minimized or eliminated by intermittently applying a nulling current consisting of a wave train of high frequency as compared with the highest frequency occurring in the translating circuits proper.

The disturbing effects sought to be eliminated come about because the semiconducting Hall plate of such a device is located in the field gap of a magnetizable core structure whose remanence, however slight, may impart to the device a memory effect so that, after using the device, it may generate a residual output voltage even though the controlling input current or the field current applied to the excitation coil of the magnetizable core has become zero. As explained in the above-mentioned patent, such memory effects can be virtually eliminated by intermittently exciting the magnetic field system by a high-frequency nulling current which passes through an auxiliary winding provided on the magnetizable core in addition to the signal-excited main energizing winding. It is also disclosed in the above-mentioned patent (Fig. 4) that the oscillation generator for providing the high-frequency nulling current may comprise an amplifier. In principle, the nulling effect becomes more favorable with an increasing frequency, but the efficiency of the oscillator declines in the range above certain frequency values in the order of 10,000 c.p.s.

It is an object of the present invention to improve devices of the above-mentioned type and to obtain a better remanence-nulling action at frequencies in the order of magnitude of 10,000 c.p.s. and even higher values without excessively reducing the efficiency and economy of the device.

We have discovered that these objects are achieved if, according to our invention, the remanence-nulling high-frequency oscillations are caused to build up to their full amplitude much more rapidly than is the case with the circuitry heretofore disclosed. According to our invention, therefore, we produce the nulling oscillations by an amplifying oscillator network, keyed by the translated signals, whose oscillatory output circuit, comprising the above-mentioned auxiliary winding on the magnetizable core of the Hall generator, is feed-back coupled with the amplifier input or keying circuit. The amplifier used for this purpose may be an electronic-tube device but is preferably a transistor amplifier.

According to a more specific feature of our invention, the amplifier whose output circuit includes the auxiliary winding as well as capacitance means, is feed-back coupled in itself. That is, the oscillatory output circuit of the amplifier is directly coupled with the amplifier input circuit independently of, or in addition to, any indirect coupling existing between the main excitation winding and the auxiliary winding of the magnetizable core.

The amplifying oscillator network thus made capable of self-excitation, may supply the nulling alternating voltage continuously, or the nulling oscillation can be made effective by keying the oscillator under control by the signal to be translated.

The foregoing and more specific features of our invention will be further explained with reference to the drawings, in which several embodiments of translating devices according to the invention are illustrated by way of example.

Figures 1, 2, 3, 4, 5:
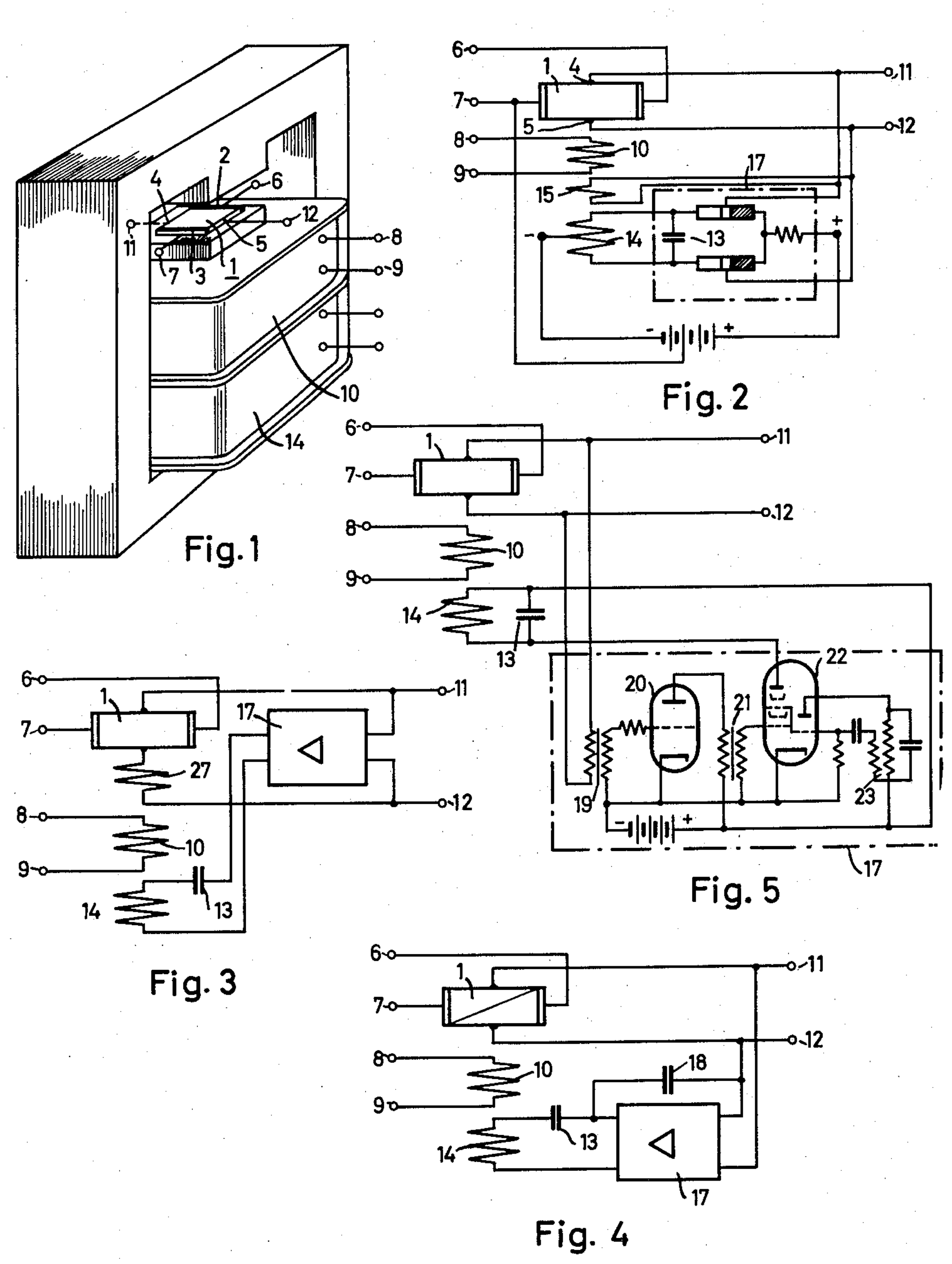
Fig. 1 shows in diagrammatic perspective a Hall generator of the type applicable for the purposes of the invention.
Figs. 2, 3, 4 and 5 illustrate four different circuit diagrams of devices according to the invention, each comprising a Hall generator as shown in Fig. 1.

According to Fig. 1, a semiconducting Hall plate 1, consisting of indium antimonide or indium arsenide, is provided with two current terminal electrodes 2, 3 and with two lateral electrode connections 4 and 5 for supplying the Hall voltage. The Hall plate 1 is located in a very narrow gap, about 20 microns wide, of a magnetizable core structure. When using as semiconducting material a substance whose carrier mobility is about 20,000 $cm.^2$/volt second, as is the case with indium arsenide or indium antimonide, a power amplification of approximately 10 can be obtained. Impressed upon the terminals 6 and 7 of the electrodes 2, 3 is an alternating voltage of substantially constant carrier frequency and constant amplitude which may be taken from an alternating-current utility line of 50 or 60 c.p.s., so that the Hall plate, during operation, is traversed by carrier-frequency current. The control or signal voltage proper, which is to be converted into an alternating voltage, is impressed upon the input terminals 8, 9 and passes a current through the field excitation winding 10 of the core, so that the magnetic field to which the Hall plate is exposed varies in accordance with the signal voltage. The output voltage is taken from the terminals 11 and 12 of the Hall electrode connection 4, 5. The signal voltage applied to the terminals 8, 9 may be a slowly variable direct-current magnitude. However, the input signal may also consists of an alternating voltage having a low frequency in comparison with the carrier frequency. The input signals may vary in accordance with any regular or irregular function, the wave shape of the variation being not essential. For example, the signals may be formed by pulses or stepwise variable currents which may also change their polarity. The output voltage across terminals 11 and 12 in each case is indicative of the input signal modulated in accordance with the carrier frequency applied to terminals 6, 7.

As explained in the above-mentioned patent, a Hall-voltage generating device of the type described, can be made to excite itself to high-frequency oscillations which act intermittently to reduce the effect of remanence in the core structure. The oscillating circuit thus produced is tuned to a frequency much higher than the carrier frequency and comprises a capacitor as well as the inductance of an auxiliary winding 14 mounted on the magnetizable core. When using as carrier frequency an alternating voltage from a utility line of 50 or 60 c.p.s., the oscillatory circuit is preferably tuned to a few kilocycles per second.

However, when operating with remanence-nulling frequencies of 10 kilocycles or more, the desired effect is not obtained to a satisfactory degree and this, we have found, is due to the fact that the high-frequency oscillations build themselves up too slowly. We therefore provide, as stated above, a feed-back coupling of the kind now to be described wtih reference to Figs. 2 to 5.

In the device illustrated in Fig. 2 the current to be translated is supplied through terminals 8, 9 as described above. The carrier-frequency current is supplied through terminals 6, 7 to main excitation winding 10. The Hall voltage across output terminals 11, 12 is impressed upon the input stage of a transistor amplifier 17 whose output circuit comprises a capacitor 13 in parallel with the auxiliary winding 14. The tank circuit formed by winding 14 and capacitor 13 is tuned to the high frequency desired for the purpose of nulling the remanence of the magnetizable core. In this particular embodiment the auxiliary winding 14 has a mid-tap to which one pole of a direct-voltage source (120 volt) is attached. The other pole is connected through a resistor (2 kilo-ohm) to the two junction-type transistors. The resulting push-pull network is inherently feed-back excited to cause self-oscillation of the tank circuit. Coil 15, also mounted on the magnetizable core, is a feed-back coil energized by connection across the Hall voltage electrodes. Coil 15 promotes the build-up of the oscillations in remanence-nulling winding 14.

In the embodiment of Fig. 3, a carrier frequency current is supplied to terminals 6 and 7, a signal voltage is applied across the terminals 8, 9 of the main excitation winding 10, and the output voltage across terminals 11, 12 exhibits the signal voltage modulated in accordance with the carrier frequency.

An amplifier 17 has its input branch connected across the terminals 11, 12 to be excited by the Hall output voltage of the device. The output branch of amplifier 17 comprises a capacitor 13 in series with the auxiliary winding 14. In addition, the output branch of the amplifier 17 is feed-back connected with the input circuit by a feed-back winding 27 additionally mounted on the magnetizable core and serially connected in the Hall-voltage output circuit. The winding 27 inductively reduces damping and thus promotes the build-up of the oscillations in the circuit of winding 14.

In the embodiment of Fig. 4 the output branch of the amplifying oscillator network, comprising a capacitor 13 and the auxiliary winding 14, is feed-back connected with the input branch of the amplifier 17 by a capacitor 18.

The embodiment of Fig. 5 is provided with means which produce in the amplifying network itself an auxiliary frequency for keying the amplifier 17. The Hall voltage is impressed through a transformer 19 upon the control grid of an electronic tube 20 whose plate circuit supplies the amplified Hall voltage through a transformer 21 to the hexode portion of a twin tube 22. The tube 22 has a triode portion connected to a conventional network 23 for producing oscillations in the triode portion. These oscillations are applied to the middle control grid of the hexode for controlling the current in the hexode output circuit which comprises the auxiliary winding 14 and a capacitor 13. In each positive phase of modulation, the tank circuit 13, 14 is excited to tuned oscillations which are permitted to decay during the next following negative modulating phase to thus magnetically de-energize the iron core of the Hall generator.

In all embodiments the performance of the system, in principle, is similar to that of the devices described and more fully explained in the above-mentioned Patent 2,862,189, except that the remanence-nulling oscillations have an increased amplitude and are built up to their full amplitude in much shorter time than obtainable in the devices heretofore disclosed. As a result, the desired remanence-nulling operation is more effective particularly at frequencies in the neighborhood of 10,000 c.p.s. or above.

We claim:

1. In an electric-current translating device comprising a Hall-voltage generator having semiconducting Hall plate means provided with current supply terminals and Hall electrodes, a magnetizable core with a gap field in which said plate means is disposed, a main field excitation winding on said core, an input circuit having a source of signal current, the input circuit being connected to said winding, an energizing circuit having a carrier-frequency source, said energizing circuit being connected to said terminals to pass current through said plate means, said latter source having a higher frequency than the variation of said signal current, the signal current being taken from the class consisting of variable direct-current and alternating voltage of lower-frequency than said carrier frequency, an output circuit connected to said Hall electrodes to provide translated voltage, and oscillation circuit means including a second field excitation winding on said core, said oscillation circuit means having a higher frequency than said carrier frequency, for diminishing magnetic remanence effects of said core, said oscillation means being energized by the Hall voltage produced by said Hall plate means; the improvement therein comprising a third winding on said core, the third winding constituting a feed back energized by the Hall voltage of the plate means.

2. In an electric current-translating device comprising a Hall-voltage generator having semiconducting Hall plate means provided with current supply terminals and Hall electrodes, a magnetizable core with a gap field in which said plate means is disposed, a main field excitation winding on said core, an input circuit having a source of signal current, the input circuit being connected to said winding, an energizing circuit having a carrier-frequency source, said energizing circuit being connected to said terminals to pass current through said plate means, said latter source having a higher frequency than the variation of said signal current, the signal current being taken from the class consisting of variable direct current and alternating voltage of lower frequency than said carrier frequency, an output circuit connected to said Hall electrodes to provide translated voltage, and oscillation circuit means including a second field excitation winding on said core, said oscillation circuit means having a higher frequency than said carrier frequency, for diminishing magnetic remanence effects of said core, said oscillation means being energized by the Hall voltage produced by said Hall plate means; the improvement therein comprising a third winding on said core, the third winding constituting a feed back energized by the Hall voltage of the plate means, said oscillation circuit means comprising an amplifier apparatus having its input circuit connected across the Hall electrodes and having its output circuit electrically connected to energize said second field excitation winding, said third winding being serially connected with said amplifier input circuit.

3. In an electric current-translating device comprising a Hall-voltage generator having semiconducting Hall plate means provided with current supply terminals and Hall electrodes, and having a magnetizable core with a gap field in which said plate means is disposed, a main field excitation winding on said core, an input circuit having a source of signal current, the input circuit being connected to said winding, an energizing circuit having a carrier-frequency source and being connected to said terminals to pass current through said plate means, said latter source having a higher frequency than the variation of said signal current, the signal current being taken from the class consisting of variable direct current and alternating voltage of lower frequency than said carrier frequency, an output circuit connected to said Hall electrodes to provide translated voltage, and oscillation circuit means inductively linked with said core and having a higher frequency as compared with said carrier frequency for nulling of magnetic remanence effects of said core, said oscillation means including an amplifier means having its input circuit connected across the Hall electrodes for energizing by the Hall voltage produced by the Hall plate means, said amplifier means having its output circuit connected to energize said second winding; the improvement comprising a feed-back circuit means connected between the amplifier output circuit and its input circuit.

4. The device defined in claim 3, the said feed-back circuit means comprising a condenser.

5. In an electric current-translating device, comprising a Hall-voltage generator having semiconducting Hall plate means provided with current supply terminals and Hall electrodes, a magnetizable core with a gap field in which said plate means is disposed and a main field excitation winding on said core, an input circuit having a source of signal current, the input circuit being connected to said winding, an energizing circuit having a source of carrier frequency, the energizing circuit being connected to said terminals to pass current through said plate means, said carrier frequency source having a higher frequency than the variation of said signal current, the signal current being taken from the class consisting of variable direct current and alternating voltage of lower frequency than said carrier frequency, an output circuit connected to said Hall electrodes to provide translated voltage, a second winding on said core, oscillator circuit means including said other winding and having a frequency of a higher decimal order of magnitude than said carrier frequency for nulling of remanence effects, said oscillator circuit means including an amplifier means having its input circuit connected across the Hall electrodes for energizing by the Hall voltage produced by the Hall plate means, to intermittently produce time-limited trains of oscillations in dependence upon peak amplitude values of the carrier frequency, said amplifier having its output circuit connected to energize said second winding, the amplifier output circuit comprising a capacitor connected in parallel with said second winding to form together therewith a tank circuit of said high frequency; the improvement therein comprising a feed-back connection between the amplifier output circuit and its input circuit.

6. The device defined in claim 5, the second winding having an intermediate tap, a resistor, a constant direct-voltage source connected between said tap and the resistor, the amplifier comprising two junction-type transistors in series with each other and said condenser and with the second winding, the transistors being energized by connection to the first mentioned output circuit connected to the Hall electrodes.

7. In an electric current-translating device, comprising a Hall-voltage generator having semiconducting Hall plate means provided with current supply terminals and Hall electrodes, a magnetizable core with a gap field in which said plate means is disposed and a main field excitation winding on said core, an input circuit having a source of signal current, the input circuit being connected to said winding, an energizing circuit having a source of carrier frequency, the energizing circuit being connected to said terminals to pass current through said plate means, said carrier frequency source having a higher frequency than the variation of said signal current, the signal current being taken from the class consisting of variable direct current and alternating voltage of lower frequency than said carrier frequency, an output circuit connected second winding on said core, oscillator circuit means including said other winding and having a frequency of a higher decimal order of magnitude than said carrier frequency for nulling of remanence effects, said oscillator circuit means including an amplifier means having its input circuit connected across the Hall electrodes for energizing by the Hall voltage produced by the Hall plate means, to intermittently produce time-limited trains of oscillations in dependence upon peak amplitude values of the carrier frequency, said amplifier having its output circuit connected to energize said second winding, the amplifier output circuit comprising a capacitor connected in parallel with said second winding to form together therewith a tank circuit of said high frequency; the following improvement therein: said amplifier including a first electronic tube having a control grid and a plate-filament circuit transformer means energized by connection to the Hall voltage electrodes, the Hall voltage being impressed through said transformer upon the control grid, a twin electronic tube having hexode and triode portions, the said plate circuit being connected to supply the amplified Hall voltage to a grid part of the hexode portion, the triode portion having a network for producing oscillations therein, connections for applying the latter oscillations to the grid part of the hexode portion, the hexode having an output circuit which comprises said second winding and capacitor.

References Cited in the file of this patent

UNITED STATES PATENTS

| | | |
|---|---|---|
| 1,778,796 | Craig | Oct. 21, 1930 |
| 2,862,189 | Kuhrt | Nov. 25, 1958 |